US006571360B1

(12) United States Patent
Drogichen et al.

(10) Patent No.: US 6,571,360 B1
(45) Date of Patent: May 27, 2003

(54) CAGE FOR DYNAMIC ATTACH TESTING OF I/O BOARDS (75) Inventors: Daniel P. Drogichen, Leucadia, CA (US); Eric Eugene Graf, Hillsboro, OR (US); Don Kane, San Diego, CA (US); Douglas B. Meyer, San Diego, CA (US); Andrew E. Phelps, Encinitas, CA (US); Patricia Shanahan, San Diego, CA (US); Steven F. Weiss, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/422,204

(22) Filed: Oct. 19, 1999

(51) Int. Cl.[7] .................................................. G06F 11/00

(52) U.S. Cl. ........................................... 714/44; 714/40

(58) Field of Search ............................. 714/31, 33, 40, 714/44; 710/9, 37; 711/153; 703/25

(56) References Cited

U.S. PATENT DOCUMENTS 5,394,554 A * 2/1995 Elko et al. .................. 709/224
5,479,618 A * 12/1995 Van de Steeg et al.
5,692,161 A * 11/1997 Basset et al. ................. 703/24
5,978,862 A * 11/1999 Kou et al. ..................... 710/14

OTHER PUBLICATIONS

"Ultra™ 10000: Dynamic System Domains," Technical White Paper, © 1997 by Sun Microsystems, Inc., pp. 1–11.
"Ultra™ Enterprise™ 10000 Server: SunTrust™ Reliability, Availability, and Serviceability," Technical White Paper, © 1997 by Sun Microsystems, Inc., pp. 1–29.
Charlesworth, "Starfire: Extending the SMP Envelope," IEEE Micro, Jan. 1998, pp. 39–49.
Partial chapter describing the I²C bus interface unit of the i960® RM/RN I/O Processor, printed from the Intel® website on May 20, 1999, 5 pages.
"High–Performance Memory," Sun Enterprise Servers, © 1994–1998 by Sun Microsystems, Inc., 2 pages.
"Expandable I/O Modules," Sun Enterprise Servers, © 1994–1998 by Sun Microsystems, Inc., 3 pages.
Gigaplane–XB™ Interconnect, Sun Enterprise Servers, © 1994–1998 by Sun Microsystems, Inc., 3 pages.

(List continued on next page.)

Primary Examiner—Robert Beausoliel
Assistant Examiner—Bryce P. Bonzo
(74) Attorney, Agent, or Firm—Meyertons, Hood, Kivlin, Kowert & Goetzel, P.C.; B. Noël Kivlin (57) ABSTRACT A multiprocessing computer system provides the hardware support to properly test an I/O board while the system is running user application programs and while preventing a faulty board from causing a system crash. The system includes a centerplane that mounts multiple expander boards. Each expander board in turn connects a microprocessor board and an I/O board to the centerplane. Prior to testing, the replacement I/O board becomes a part of a dynamic system domain software partition after it has been inserted into an expander board of the multiprocessing computer system. Testing an I/O board involves executing a process using a microprocessor and memory on a microprocessor board to perform hardware tests on the I/O board. An error cage, address transaction cage, and interrupt transaction cage isolate any errors generated while the I/O board is being tested. The error cage isolates correction code errors, parity errors, protocol errors, timeout errors, and other similar errors generated by the I/O board under test. The address transaction cage isolates out of range memory addresses from the I/O board under test. The interrupt transaction cage isolates interrupt requests to an incorrect target port generated by the I/O board under test. The errors generated by the I/O board are logged in a status register and suppressed.

23 Claims, 5 Drawing Sheets

OTHER PUBLICATIONS

"System Architecture," Sun Enterprise Servers, © 1994–1998 by Sun Microsystems, Inc., 3 pages.

System Architecture, System Service Processor (SSP), Sun Enterprise Servers, © 1994–1998 by Sun Microsystems, Inc., 2 pages.

"SunTrust Availability," Sun Enterprise Servers, © 1994–1998 by Sun Microsystems, Inc., 4 pages.

"Solaris™," Sun Enterprise Servers, © 1994–1998 by Sun Microsystems, Inc., 4 pages.

"Dynamic System Domains," Sun Enterprise Servers, © 1994–1998 by Sun Microsystems, Inc., 3 pages.

* cited by examiner

FIG. 5 (Con't)

CAGE FOR DYNAMIC ATTACH TESTING OF I/O BOARDS

BACKGROUND OF THE INVENTION

1. Field of the Invention

This invention relates to the field of multiprocessor computer systems and, more particularly, to the testing of an I/O Board that is connected to a multiprocessing computer system.

2. Description of the Related Art

Multiprocessor computer systems include two or more processors that may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device that executes programmed instructions to produce desired output signals, often in response to user-provided input data.

A popular architecture in commercial multiprocessor computer systems is the symmetric multiprocessor (SMP) architecture. Typically, an SMP computer system comprises multiple processors each connected through a cache hierarchy to a shared bus. Additionally connected to the shared bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Another architecture for multiprocessor computer systems is a distributed shared memory architecture. A distributed shared memory architecture includes multiple nodes that each include one or more processors and some local memory. The multiple nodes are coupled together by a network. The memory included within the multiple nodes, when considered as a collective whole, forms the shared memory for the computer system.

Distributed shared memory systems are more scaleable than systems with a shared bus architecture. Since many of the processor accesses are completed within a node, nodes typically impose much lower bandwidth requirements upon the network than the same number of processors would impose on a shared bus. The nodes may operate at high clock frequency and bandwidth, accessing the network only as needed. Additional nodes may be added to the network without affecting the local bandwidth of the nodes. Instead, only the network bandwidth is affected.

Because of their high performance, multiprocessor computer systems are used for many different types of mission-critical applications in the commercial marketplace. For these systems, downtime can have a dramatic and adverse impact on revenue. Thus system designs must meet the uptime demands of such mission critical applications by providing computing platforms that are reliable, available for use when needed, and easy to diagnose and service.

One way to meet the uptime demands of these kinds of systems is to design in fault tolerance, redundancy, and reliability from the inception of the machine design. Reliability features incorporated in most multiprocessor computer systems include environmental monitoring, error correction code (ECC) data protection, and modular subsystem design. More advanced fault tolerant multiprocessor systems also have several additional features, such as full hardware redundancy, fault tolerant power and cooling subsystems, automatic recovery after power outage, and advanced system monitoring tools.

For mission critical applications such as transaction processing, decision support systems, communications services, data warehousing, and file serving, no hardware failure in the system should halt processing and bring the whole system down. Ideally, any failure should be transparent to users of the computer system and quickly isolated by the system. The system administrator must be informed of the failure so remedial action can be taken to bring the computer system back up to 100% operational status. Preferably, the remedial action can be made without bringing the system down.

In many modern multiprocessor systems, fault tolerance is provided by identifying and shutting down faulty processors and assigning their tasks to other functional processors. However, faults are not limited to processors and may occur in other portions of the system such as, e.g., interconnection traces and connector pins. While these are easily tested when the system powers up, testing for faults while the system is running presents a much greater challenge. This may be a particularly crucial issue in systems that are "hot-swappable", i.e. systems that allow boards to be removed and replaced during normal operation so as to permit the system to be always available to users, even while the system is being repaired.

Examples of hardware components that can be hot-swapped in some systems include microprocessor boards, memory boards, and I/O boards. A microprocessor board may typically contain multiple microprocessors with supporting caches. I/O boards typically contain I/O ports for coupling the system to various peripherals. The I/O ports may take the form of expansion slots configured according to any one of many different busing standards such as PCI, SBus or EISA.

Ideally, as one of these hardware components is installed in the multiprocessing computer system, the component should be automatically tested to detect faults before being inducted into the system. Hardware components that include a microprocessor can be configured to do an automatic self-test. However, typical I/O boards do not include microprocessors, and it is undesirable to add a microprocessor to an I/O board solely for the purpose of performing an automatic self-test.

SUMMARY OF THE INVENTION

The problems outlined above are in large part solved by a multiprocessing computer system employing an error cage for dynamic reconfiguration testing of a I/O board as it is being connected. In one embodiment, the multiprocessing computer system provides the hardware support to properly test an I/O Board while the system is running user application programs. The hardware support also prevents a faulty board from causing a complete system crash. The multiprocessor computer system includes a centerplane that mounts multiple expander boards. Each expander board in turn connects a processor board and an I/O board to the centerplane.

During operation of the multiprocessing computer system, a hot-swapped I/O board is first electrically coupled to the system as it is inserted into the expander board. The I/O board is then tested, and if it passes, incorporated logically into the running multiprocessor computer system and allowed to execute the operating system and application programs for users.

In one embodiment, testing of the I/O board proceeds in the following manner. Prior to testing, the I/O board is logically connected to the target domain as it would be for a dynamic reconfiguration attach. A process using a microprocessor and memory on a microprocessor board performs hardware testing of the I/O board. A hardware failure cage, address transaction cage, and interrupt transaction cage, isolate any errors generated while the I/O board is being tested. The hardware failure cage isolates error correction code errors, parity errors, protocol errors, timeout errors and other similar errors generated by the I/O board under test. The address transaction cage isolates out-of-range memory addresses from the I/O board under test. The interrupt transaction cage isolates incorrect interrupt requests generated by the I/O board under test. After testing is complete the I/O board is logically disconnected from the domain as it would be for dynamic reconfiguration detach. Any errors generated by the I/O board while being tested are logged by the hardware for possible retrieval by the system controller.

The preferred system and method prevents a faulty I/O board from causing errors in the isolated portion of the system, thereby shielding ongoing user applications and preventing any system crashes that might result from propagation of incorrect signals from the faulty I/O board.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
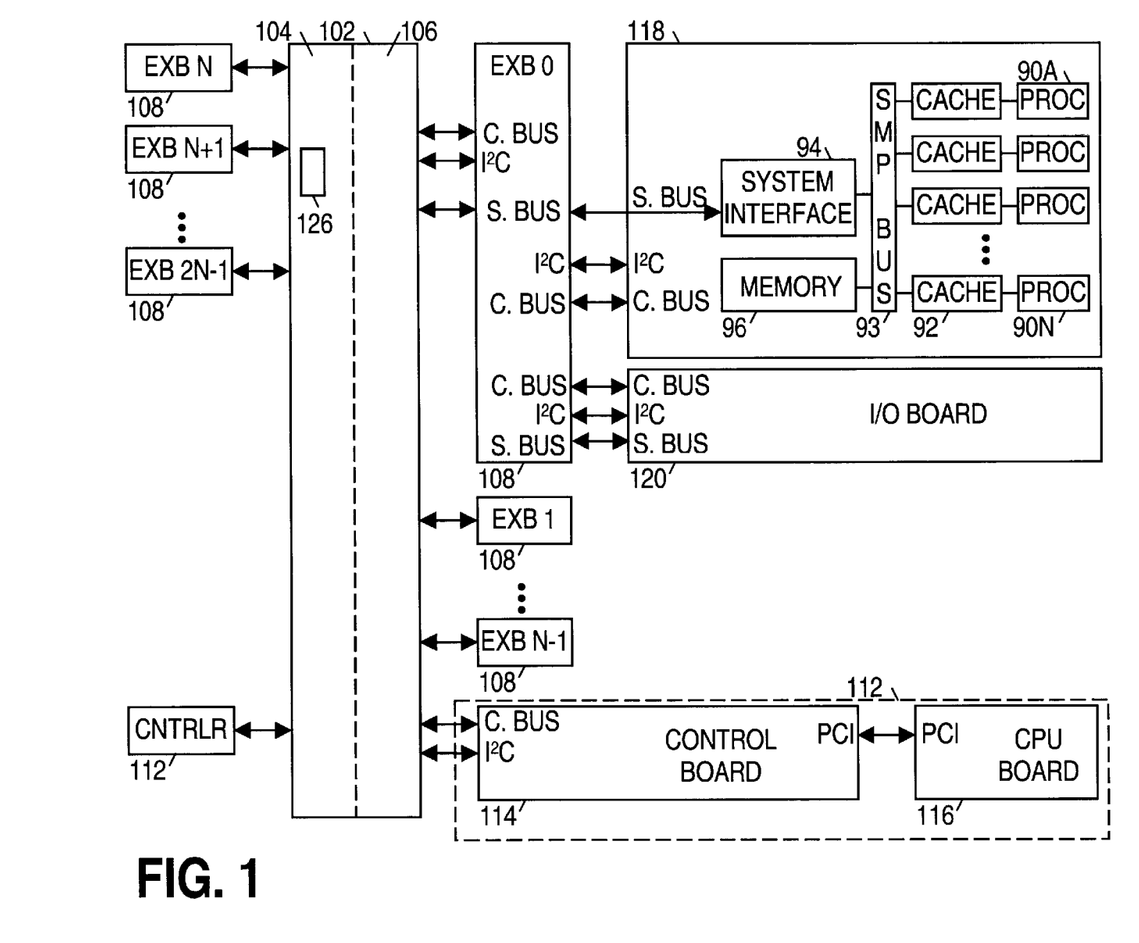
FIG. 1 is a block diagram depicting the architecture of one embodiment of a multiprocessing computer system.

Turning now to FIG. 1, a block diagram of one embodiment of a multiprocessing computer system is shown. This system provides the hardware support to properly test I/O board 120 while shielding the system from a system crash and while allowing the system to continue running user application programs. A centerplane 102 may be, e.g., a 16×16 crossbar interconnection network such as Sun Microsystems' Gigaplane-XB. This centerplane embodiment contains two symmetrical sides 104 and 106 that can each mount multiple expander boards (EXB) 108 and a system control board 112. Each expander board 108 can mount a microprocessor board 118 and an I/O board 120. The expander boards 108 connect to the centerplane through the system interconnect bus labeled S.BUS in FIG. 1. The system interconnect bus is the primary bus used for domain data and address communication in the system. The system interconnect bus is supported by control and arbitration subsystems that are all the objects of the caging mechanism described below. Any errors or interrupts caused by incorrect data or addresses appear on the system bus. The system control boards 112 connect to the centerplane through Console Bus and $I^2C$ bus. Console Bus is a bus developed by Sun Microsystems Inc. and is a relatively low-performance service bus that can only be mastered by the system controller. The $I^2C$ (Inter-Integrated Circuit) bus is a serial data bus developed by Philips Corporation having a two line interface. One line is a data line for input and output functions and the other is a clock line for reference and control.

An I/O board 120 and microprocessor board 118 are shown in FIG. 1 connected to an expander board by the system interconnect bus. Each of the other expander boards may also connect a microprocessor board and an I/O board to the centerplane. Each expander board 108 contains two slots designated Slot0 and Slot1. Slot0 is configured to hold a microprocessor board 118 that contains a number of microprocessors 90A–90D. One exemplary embodiment allows four microprocessors such as Sun Microsystems Inc. UltraSPARC III microprocessor with supporting external cache 92 on the microprocessor board 118. The processors are connected through a symmetric multiprocessor (SMP) bus 93 to system interface logic 94 which then connects through System Bus to the expander board 108. The processors are also connected to memory 96 through the symmetric multiprocessor bus. The system interface logic connected through System Bus to the expander board includes multiplexers for multiplexing data, address, and control signals and repeaters for amplifying and multiplying signals to and from the microprocessor board. Slot1 is configured to hold an I/O board 120. The I/O board may preferably contain multiple PCI interfaces.

The system control boards 112 each contain the system-level logic. The system control board 112 includes a control board 114 and a processor board 116. The control board 114 includes the system clock generator, bus master devices for the Console and $I^2C$ buses, and temperature and airflow sensors. A PCI interface couples the processor board 116 to the control board, and allows the processor board 116 to control the various components of the control board 114. The processor board 116 handles diagnostics, boot, shutdown and environmental monitoring. The processor board 116 includes a microprocessor in addition to various programmable read only memories (PROMs) containing software for configuration and testing of the hardware in the multiprocessing computer system. The multiprocessing computer system requires at least one system control board for proper operation. However, for higher levels of system availability a second optional system control board may be installed as shown in FIG. 1.

In a preferred multiprocessor computer system embodiment, the system can be logically subdivided into multiple dynamic system domains. Each dynamic system domain is equivalent to a separate shared-memory SMP system that runs its own local copy of a multiprocessing operating system such as Sun Microsystems Inc. Solaris and has its own disk storage and network connections. The domains are partitioned by hardware in the centerplane as discussed further below. A dynamic system domain may consist of a group of microprocessor boards and a group of I/O boards. Many different domain schemes are possible to partition the computer system microprocessor boards. For example, for a system containing 16 boards with 4 processors each (64 processors total in the computer system), one dynamic system domain may contain 12 boards (48 processors) running a multiprocessing operating system such as Sun Microsystems Inc. Solaris. A second dynamic system domain could be a two-board (8-processor) domain for checking out a beta test version of the next release of the multiprocessing operating system. A third domain could be a two-board (8 processor) domain running a special application. This domain could be used for proving that the application is fully stable before releasing it for sale to the general public.

During operation of the multiprocessing computer system, a replacement microprocessor board 118 or I/O board 120 is first electrically coupled to the system as it is inserted into the expander board. The replacement board is then tested, and if it passes, incorporated logically into the running multiprocessor computer system and allowed to execute the operating system and application programs for users. In one embodiment, the replacement microprocessor or I/O board becomes a part of a dynamic system domain after it has been inserted into the centerplane of the multiprocessing computer system. Because individual system domains are logically isolated from other system domains, hardware and software errors are confined to the domain in which they occur and do not affect the rest of the system.

Global arbiters 126 in the centerplane specify the I/O and microprocessor boards that comprise a domain. The global arbiters 126 each contain a set of domain control registers to provide the separation between unrelated domains. For each microprocessor board 118 and I/O board 120 there is a register that, when the bits are set to one, establishes the set of I/O and microprocessor boards in a particular board's domain group.

After a system administrator requests a particular domain configuration, the system controller 112 dynamically configures the various microprocessor and I/O boards into dynamic system domains in the multiprocessing computer system. This means that the system controller can idle a group of processors, assign them and some system resources to a new system domain, and "boot" the new domain with an operating system. This dynamic reconfiguration can be performed while the multiprocessing computer system is in operation. Microprocessor and I/O boards may be switched between domains or removed from all active domains for testing, upgrades, or servicing.

In one embodiment, the moving of a component from one domain to another proceeds in two phases: detach and attach. During a detach operation, microprocessor and I/O boards are detached to reallocate them to another dynamic system domain or to remove them for upgrade or repair. Process execution, network and I/O connections, and the contents of memory must be migrated to other boards. The detach has two steps. In the first step, the multiprocessing operating system flushes all pageable memory to disk and remaps kernel memory to other boards. Free pages are locked to prevent further use. As the first detach step proceeds, the multiprocessing operating system switches network devices and file systems to alternate paths (i.e., to other boards). Finally, the processors are taken offline.

In the second step of detachment, the centerplane hardware isolates the component from its previous system domain. The microprocessor or I/O becomes available for attachment to another domain or for physical removal from the system. If removed, a new, repaired, or upgraded board can be physically inserted into a running system and powered-on in preparation for doing an attach.

The attach operation connects a microprocessor or I/O board to a domain and makes it possible to perform online upgrades, redistribute system resources for load balancing, or reintroduce a board after it has been tested and repaired. The attach operation diagnoses and configures the candidate hardware board so that it can be safely introduced into the running multiprocessor system.

Two steps are performed during the attach phase. In the first step, the board is added to the resource list of the target domain. The board is then tested and configured by test software. One of the operations of the test software is to isolate the candidate board from other domain components. Once testing and configuration have successfully completed, the centerplane domain registers are configured to include the candidate board in the target domain.

After the operations in the first step are complete, in the second step the target domain's operating system kernel is presented with the board configuration. The multiprocessor operating system then performs the final steps needed to start the processors, add the memory to the available page pool, and/or connect any on-board I/O devices or network connections. The candidate hardware is then able to actively participate in the workload of the domain.

The use of dynamic reconfiguration permits new boards of different types to be attached to a running system. However, as mentioned above, the new board must be tested to minimize the probability that its introduction into a running domain will crash that domain. Boards with processors can perform self-tests in the first attach step. However, Input/Output boards without processors cannot adequately perform self-testing. The actively running domains have processors available for testing the I/O board, but it is desirable to keep the I/O board logically disconnected from any running domain until after it is tested. Accordingly, the I/O board is assigned to an actively running domain, but is provided with error cage hardware to prevent faults from affecting the rest of the domain.

One solution to the problem of testing the I/O board would be to use a microprocessor board, creating a small domain of these two boards. The normal error isolation provided by dynamic system domains will prevent faults in the I/O board from affecting the other domains, and there is no concern with any effect on the microprocessor board, since it is running only the test software, under supervision of the system controller. Because of noticeable reductions of computer system performance, even though it may be feasible to do so, it is considered unattractive as a multiprocessing computer system feature to "borrow" a complete hardware board from a running domain to do this testing. However, one processor and a range of memory can reasonably be allocated for such testing. Thus, one way to test the I/O board 120 inserted in the multiprocessing computer system is to allow one processor 90A and some of the memory 96 in a running domain to be connected to the I/O board while assuring that no hardware faults on the subject I/O board can crash the running domain. The microprocessor board 118 may be any microprocessor board in the multiprocessing system and is not necessarily a microprocessor board that is connected to the same expander board 108 as the I/O board. This technique of testing allows both hardware fault isolation and domain isolation to take place at the granularity of system boards.

An I/O board error cage provides the hardware support required to allow safe testing of the I/O board by a microprocessor in a dynamic system domain. The I/O board error cage includes a hardware failure cage, a memory transaction cage, and an interrupt transaction cage. The hardware failure cage, described in more detail below, cages Arbstop (i.e., domain bus arbitration stop) request signals from the I/O board as well as I/O board interface errors detected by the centerplane or expander board ASICs. These errors are not allowed to propagate to the rest of the domain that the I/O board is in. Thus, the hardware failure cage isolates errors within the I/O board to prevent them from disturbing the operation of the rest of the domain. The transactions in error after being detected are logged by the test status registers in the cage hardware and then discarded. The system controller can later examine the test status registers to determine if an illegal transaction has occurred. Note, however, that the error cage does not inhibit errors from the domain to the caged I/O board.

As will be described further below, the memory transaction cage includes a physical base address register and a limit register. The physical base address register and limit register, when enabled for an I/O board, specify a range of addresses. Any transaction from the I/O board not in this range of addresses is logged in test status registers by the cage hardware and then discarded.

The interrupt transaction cage includes a target port register further described below. This cage will check that the target port of all interrupt transactions generated by the I/O board are to a single configured port; if not, the transaction is logged in an test status register by the cage hardware and then discarded. The system controller can later examine the test status registers to determine if an illegal transaction has occurred.

Figure 2:
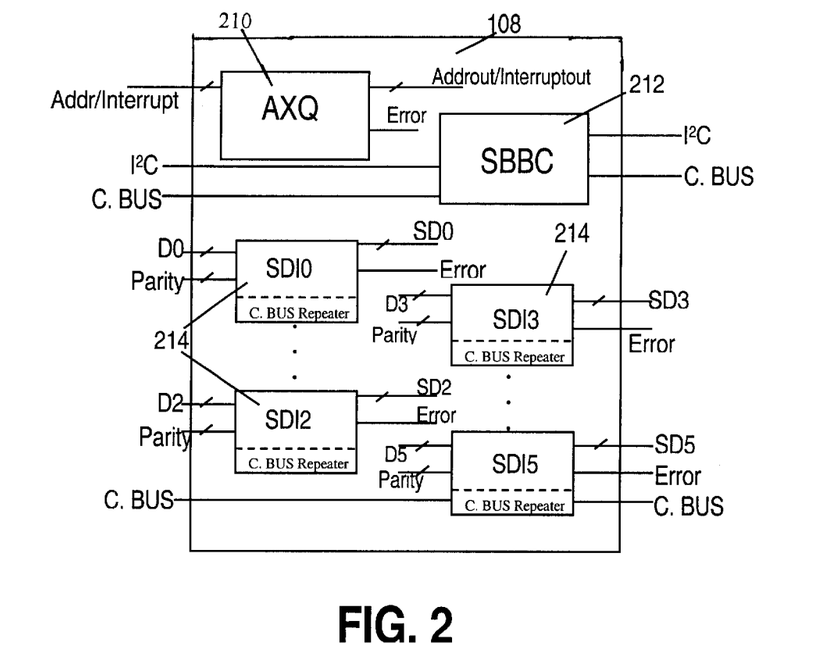
FIG. 2 is a block diagram depicting the test logic used to isolate errors in an expander board.

FIG. 2 shows the standard expander board hardware configuration which permits caging to function properly in order to test the I/O board. In FIG. 2, the input lines to the expander board Addr/Interrupt, Data (D0–D5) and parity and the output lines from the expander board Addrout/Interruptout, Dataout (SD0–SD5) and error are shown as separate discrete lines for ease of understanding, but in the preferred embodiment, are implemented as a part of the system interconnect bus S.BUS. The system interconnect bus is a packet or transaction oriented bus. One portion of this interconnect carries exclusively address/control transactions which require more than one clock cycle to complete. Another distinct portion of the interconnect transfers only data, generally at some later time as the corresponding address transaction. The address/control transaction is decoded in a multilevel fashion; a 4 or 5-bit field within the transaction denotes the transaction type. While many types of transactions contain addresses for memory or control register data reads or writes, others do not. One type that does not is an interrupt transaction, instead, it contains only the source and target port numbers of the interrupt. The filtering and error logging performed by the hardware cages described operate logically at the transaction level.

As shown in FIG. 2, the test hardware in the AXQ (Address Transaction Queue) 210 receives input address requests from the I/O board. If the address is within specified bounds, the address is allowed to pass through to the domain containing the test processor and memory. If the address is not within specified bounds, the address is suppressed and an error flag set in a status register. AXQ also contains hardware to support interrupt trapping. If the I/O board generates an interrupt to a port not the same as the interrupt port target specified in AXQ, an error flag is set in a status register and the interrupt suppressed. If the I/O board interrupt port does match with the AXQ specified value, the interrupt request is allowed to pass through to the domain containing the test processor and memory. The AXQ also processes the control signals for system transactions.

FIG. 2 also contains SDI logic 214 which implements hardware failure cage functionality as mentioned above. SDI logic when not used to implement the hardware failure cage, forwards the data associated with memory and interrupt transactions between hardware boards for potential processing. SDI0–SDI5 has input data and control signals from the I/O board. Six separate and identical SDI logic blocks allow data slicing for cost effectiveness and simplified design. Once the SDI using the data and control signals determines that an error is caused by the I/O board under test, it suppresses this error and sets a flag in a test status register. If the data and control signals do not indicate an error the signals are allowed to pass through to the domain having the test processor and memory. When the hardware failure cage logic is enabled, one of the SDI logic blocks inhibit the sending of any stop messages to global arbiters located in the centerplane, with the other five logic blocks not participating in this error concentrating function. Each of the SDI logic blocks also contain a Console Bus repeater that can amplify and repeat the C. BUS signal prior to broadcast to the microprocessor and I/O boards. The Console Bus repeater function is unused in five of the SDI logic blocks and used in one, a different SDI logic block then the one used for error concentrating, illustrated as SDI5 in FIG. 2. Finally, the System Boot Bus Controller (SBBC) 212 acts as a Console Bus slave device, allowing the system controller to master the local I$^2$C and JTAG buses, and using one of these two buses, access to all the hardware registers. The SBBC also contains the JTAG bus master logic that is used to generate JTAG test patterns locally on the expander board.

Figure 3:
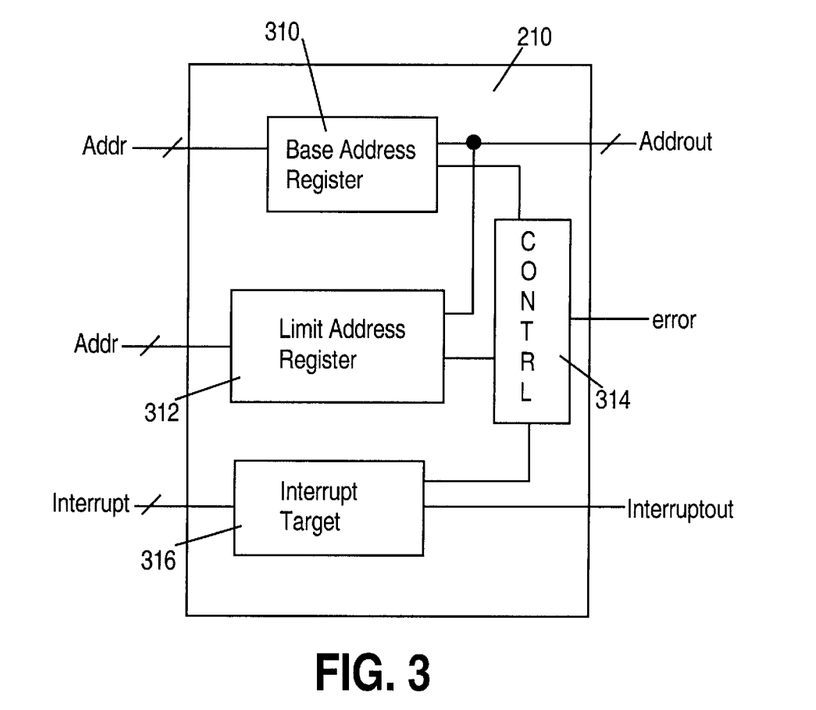
FIG. 3 is a block diagram depicting the test logic used to determine an address or interrupt error while testing the I/O board.

FIG. 3 illustrates the logic in the Address Queue 210 that implements the memory transaction cage and interrupt transaction cage described above. All addresses from the I/O board under test are compared to masked sections of the base address and limit address specified in the base address register 310 and limit address register 312. The comparison is performed in the control logic 314. If the address falls within the proper range then it is sent through Addrout lines to the domain performing the test; otherwise, if the address does not fall within the proper range, the control logic sets a error flag in a test status register and cages (suppresses) the address. An interrupt generated by the I/O board is sent to the interrupt target port register 316 in the AXQ and compared by the control logic 314. If the interrupt specifies the same port as the interrupt target port then it is sent through Interruptout to the domain performing the test; otherwise, the interrupt is caged and the control logic sets a error flag in a test status register.

Figure 4:
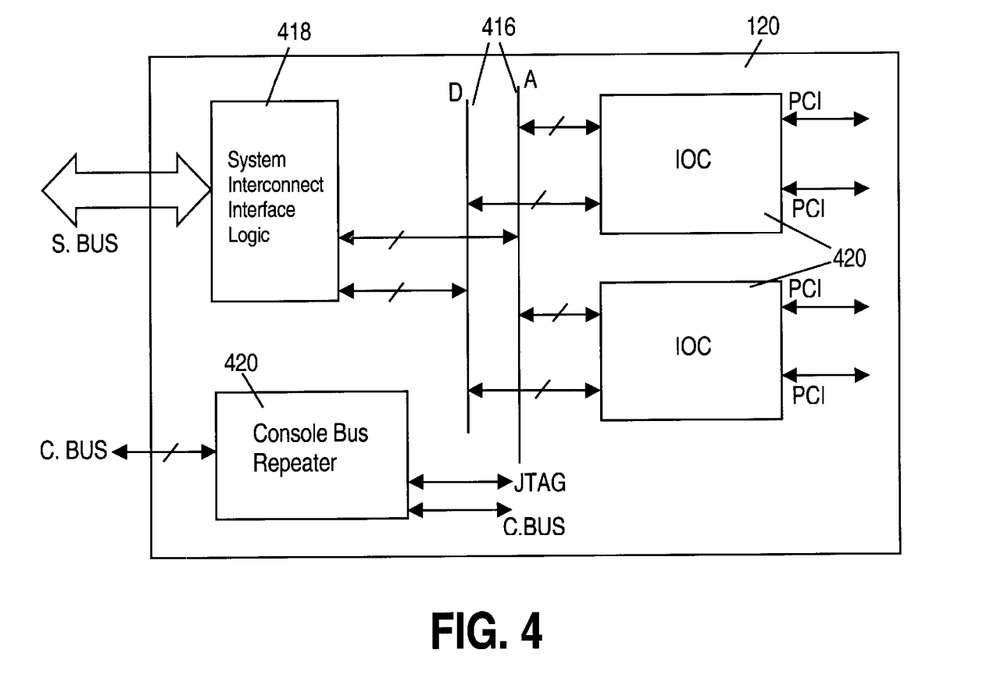
FIG. 4 is a block diagram depicting the architecture of one embodiment of an I/O board used for testing.

FIG. 4 shows the internal logic of the I/O board that is used during test while the board is caged. The I/O board contains two input-output controllers' (IOC) 420 that perform I/O specific tasks and do not run application or test code. These controllers are not processors and cannot run tests themselves. The IOCs are connected to other devices through PCI bus and through common address and data interconnect lines 416 to system interconnect interface logic 418 that sends and receives Address, Data, and Interrupt signals on the S. BUS from the expander board. Error checking occurs through parity or error correcting code (ECC) bits generated by the system bus S. BUS which is checked by SDI logic 214 on the expander board as shown in FIG. 2. The Console Bus Repeater 420 receives Console Bus signals C. BUS from the SDI logic block in the expander board and also functions as a local JTAG master, allowing the system controller to master the local JTAG bus, and using this bus, access to all devices on the board. The Console Bus Repeater also contains the JTAG bus master logic that is used to generate JTAG test patterns locally on the expander board.

The centerplane ASICs during caged testing also support Centerplane Loopback Mode (CLM) in which the processor performing the tests also tests the centerplane hardware as well as the expander board and I/O board hardware. In addition, with the arbiter cage in place and in CLM, the centerplane, expander board, microprocessor board, and I/O board ASICS operated under control of the system controller performs echo mode testing of all connections between the expander board and the centerplane ASICs when a Slot0 microprocessor board is not already in operation in the same expander as the I/O board. During this test, the centerplane ASICs are capable of providing echo signals to some expander boards while other expander boards function normally and run applications. Thus, the centerplane ASICs functionally help to create the arbiter cage. Finally, during initial power on of the multiprocessing computer system and during domain diagnostics and initialization, a normal Power-On-Self-Test (POST) is run on a configured domain which contains expander boards that have not yet been used in another domain and thus not tested in POST. Whenever running POST on an expander not currently in use and at initial power on, a Built-In-Self-Test (BIST) will be run on at least the AXQ at sufficient levels to cover the memory and interrupt transaction cage filter.

For any given expander board, two hardware scenarios exist under which the I/O board may need to be tested. The first scenario is when a microprocessor board is on the same expander in Slot0, in the target or a different domain, possibly running the multiprocessing operating system, which must not be disturbed. This can be described generically as the "expander in use" case. The second scenario takes place when no microprocessor board is in use on the expander. There is now no problem of interference with the microprocessor board, but now the expander board and its connections to the centerplane are also suspect, and must be tested. The second scenario can be described generically as the "home alone" case.

In the second scenario, "home alone," with no microprocessor board in operation in Slot0 the system controller using JTAG performs a Built-In-Self-Test (BIST) on the expander board ASICs. Next, in Centerplane Loopback Mode (CLM), with the arbiter cage in place, echo mode tests are performed on the expander to centerplane connections. Also under CLM, the system controller via JTAG carries out some simple programmed input/output (PIO) reads and writes to the IOCs on the I/O board to establish interface integrity between the expander board and IOCs and to test the overall functionality of the IOCs. In the next test in CLM, with the hardware failure cage in place, the system controller forces an expander board ASIC to tell the centerplane that it detected a fatal error from the I/O board. The system controller then verifies that this was detected by the centerplane ASICs. To confirm that the hardware failure cage properly isolates this error, the system controller verifies that the stop is not propagated back to the expander, implying that the hardware failure cage is inhibiting errors from causing a domain bus arbitration stop. Because this expander is isolated in a domain of its own using the normal domain isolation features of the centerplane ASICs, even if this cage were to fail the forced error would not propagate to the other domains in the system.

In the next sequence of tests, a test microprocessor and a range of physical memory for testing is allocated and logically detached from use by the operating system in the target domain. The microprocessor is provided with the unique I/O board number and its trap handlers are configured as required for testing. The memory transaction cage and interrupt transaction cage are configured via JTAG on the expander board. The I/O board is then placed into the target domain. The target microprocessor using the caged memory tests the I/O board and if these tests are successful, the memory transaction cage, interrupt transaction cage, hardware failure cage, and arbiter cage are disabled in that order.

Under the first scenario, with a microprocessor board operating in Slot0 the following sequence of tests are performed. First, with the I/O board defined in a domain of its own, the system controller via JTAG control performs some simple PIO reads and writes to the IOC to establish expander/IOC interface integrity and overall functionality of the IOC. With the I/O board still in its own domain and with the hardware failure cage in place, force an expander board ASIC to tell the centerplane that it detected a fatal error from the I/O board. The system controller then verifies that this is detected by the centerplane ASICs. To confirm that the hardware failure cage properly isolates this error, the system controller verifies that the stop is not propagated back to the expander, implying that the hardware cage is properly inhibiting errors. Similar to the second scenario described above, even if the hardware cage were to fail, the normal domain isolation will prevent the forced error from affecting other domains.

In the next sequence of tests, a test microprocessor and a range of physical memory for testing is allocated and logically detached from use by the operating system in the target domain. The microprocessor is provided with the unique I/O board number and its trap handlers are configured as required for testing. The memory transaction cage and interrupt transaction cage are configured via JTAG on the expander board. The I/O board is then placed into the target domain. The target microprocessor using the caged memory tests the I/O board and if these tests are successful, the memory transaction cage, interrupt transaction cage, and error cage are disabled in that order.

Figure 5:
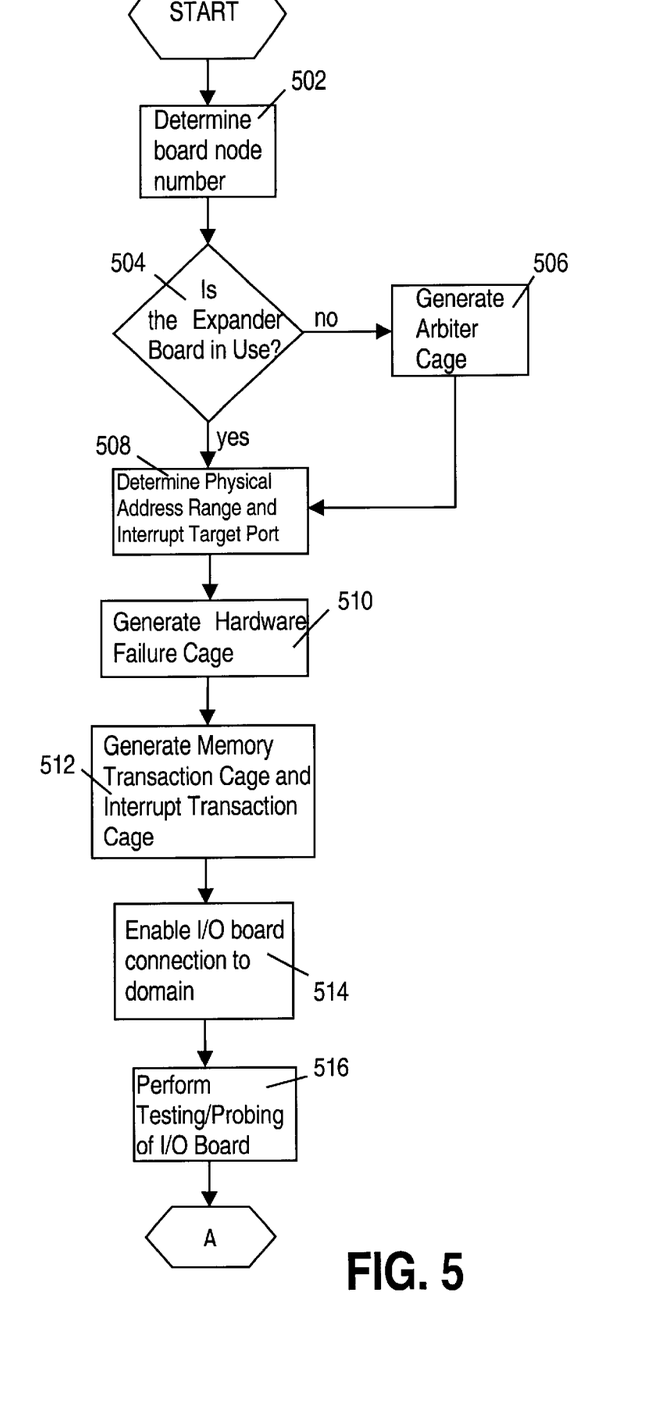
FIG. 5 is a flowchart depicting the steps for testing an I/O board in the multiprocessing computer system.

FIG. 5 illustrates the caging and test of the I/O board in greater detail. The system controller performs these operations. In block 502, the node number of the I/O board to be tested is determined. Block 504 queries the microprocessor board to determine whether the expander board has been used or is currently in use. This involves determining whether the microprocessor board in Slot0 is being used by another domain. If the microprocessor board is present and in use, then the expander board is in use and it may be safely assumed to be functional in many respects. The expander board cannot be tested fully at this time because that would disturb the board in Slot0. With the microprocessor board present and in use, the I/O board is automatically placed in a dynamic system domain of its own. If the expander board is not in use (e.g. no Slot0 microprocessor board is present), then it must be regarded as suspect. The expander board may have just been hot-swapped in. A thorough test is required of the expander board as well as the Slot1 I/O board. Whatever standalone tests are available (e.g., ASIC Logic BIST, Interconnect BIST, JTAG peek/poke) are performed on the expander board. The expander board and the I/O board are then configured to the centerplane in an isolated domain and with the same bus configuration as the target domain containing a processor and memory to perform test. Because the expander board that is not in use has not been thoroughly tested, an arbiter cage is generated. This cage causes the data arbiters located in the centerplane to inhibit any errors sourced by the I/O or expander board or detected by the data arbiters from any other source in the test cage from being forwarded to all I/O and microprocessor boards. In block 508 the system processor determines the physical address range to be used for the memory transaction cage. Next, the target port to be used for the interrupt transaction cage is determined. To be valid this must be the designated test processor. In the next block 510, the hardware failure cage is generated by setting the appropriate bit in all SDIs on the expander board. This prevents the SDI from sending any stop messages that the SDI may receive from the caged I/O board to data arbiters located in the centerplane. The SDI still detects such errors and these errors can be accessed by the system controller via SDI JTAG status registers. This hardware failure cage is performed even if no Slot0 microprocessor board is operating and an arbiter cage has been created in block 506 to ignore all errors from the I/O and expander board. In block 512, a memory transaction cage is created by configuring AXQ in the expander board. This involves setting the base address register and limit address register in AXQ to the appropriate values to specify a valid range of addresses which the I/O board may access. Next, an interrupt transaction cage is generated by setting the Interrupt target port register to a valid port number. After generating the memory transaction cage and interrupt transaction cage, I/O board logical connection to the target domain is performed in block 514. In this step, the system interconnect mask registers are modified so that the I/O board is in the same hardware domain as the target processor and memory that performs the test. After logical connection of the I/O board to the target domain, testing and probing of the I/O board is performed in block 516 to establish confidence that the I/O board is fault free and unlikely to crash the domain when the cages are removed. The test processor and memory are assumed fault-free, and the test software and multiprocessing operating system are assumed bug-free and therefore require no isolation from the I/O board in the domain. If any errors are detected during testing, block 518, then logically disconnect the I/O board from the domain, 530. Detection of errors during testing involves the system controller via JTAG registers reading the error status registers of the AXQ and all SDI ASICs on the expander board to check for errors from the I/O board. If a arbiter cage was established in block 506, then the error status registers in the DARBs for the I/O and expander board are checked by the system controller. A disconnect of the I/O board from the domain in block 530 involves modifying the system interconnect mask registers. Next in block 532, the memory transaction cage is removed by setting the base address register to 1 and limit address register to 0. The interrupt transaction cage is removed by setting the interrupt target port register to an invalid port number. In block 534, the hardware failure cage is removed by clearing the appropriate bit in all SDIs on the expander board. Finally, if a arbiter cage was created in block 506, then this cage is removed. Lastly, the errors are logged with as much specific information as possible by the system controller.

If no errors are detected by the system controller in block 518, then a logical disconnect of the I/O board from the domain is performed in block 520. Next the memory transaction cage and interrupt transaction cage are both removed in block 522 and the hardware failure cage is removed in block 524. Finally, if a arbiter cage was created in block 506 then this is removed in block 526. Steps 520–526 in this section of the flow chart involve the same actions as steps 530–536. After step 526 in block 528, since no errors were detected by the system controller the procedure exits successfully and the board is now tested and "domain ready."

Numerous variations and modifications will become apparent to those skilled in the art once the above disclosure is fully appreciated. It is intended that the following claims be interpreted to embrace all such variations and modifications.

What is claimed is:

1. A multiprocessing computer system comprising:
   a plurality of processing nodes;
   a network interconnecting said plurality of processing nodes;
   wherein a first processing node of said plurality of processing nodes is configured to receive an I/O board; and
   wherein the first processing node includes an error cage configured to selectively isolate communications originating from the I/O board directed to other nodes of said computer system during a test mode.

2. The multiprocessing computer system as recited in claim 1 wherein the error cage comprises a memory transaction cage configured to block out-of-range memory address communications generated by the I/O board as the I/O board is being tested.

3. The multiprocessing computer system as recited in claim 2 wherein the memory transaction cage comprises:
   a base address register that specifies a base address;
   a limit address register that specifies a limit address; and
   control logic that compares memory address communications to the base address and the limit address and blocks memory address communications that fall outside a range specified by the base address and limit address.

4. The multiprocessing computer system as recited in claim 3 wherein the control logic further comprises a status register that is set if a memory address communication falls outside the range.

5. The multiprocessing computer system as recited in claim 1 wherein the error cage comprises an interrupt transaction cage configured to block interrupts that are not to a selected destination.

6. The multiprocessing computer system as recited in claim 5 wherein the interrupt transaction cage comprises:
   an interrupt target port register that specifies an interrupt target port;
   control logic that compares an interrupt target port request from the I/O board to the interrupt target port register and blocks the interrupt target port request if the interrupt target port request does not match the interrupt target port register.

7. The multiprocessing computer system as recited in claim 6 wherein the control logic further comprises a status register that is set if the interrupt target port request does not match the interrupt target port register.

8. The multiprocessing computer system as recited in claim 1 wherein said plurality of processing nodes forms a distributed shared memory computer system.

9. The multiprocessing computer system as recited in claim 1 wherein a microprocessor board in the first processing node is configured to perform tests on the I/O board.

10. The multiprocessing computer system as recited in claim 9 wherein the microprocessor board comprises:
    a plurality of microprocessors connected by a bus; and
    memory connected to the bus.

11. The multiprocessing computer system as recited in claim 9 wherein a microprocessor and memory on the microprocessor board tests the I/O board.

12. The multiprocessing computer system as recited in claim 9 wherein the processing node includes a expander board that receives the I/O board and the microprocessor board.

13. The multiprocessing computer system as recited in claim 1 wherein the error cage comprises a hardware failure cage configured to block parity errors, protocol errors, timeout errors, and other similar errors generated by the I/O board as the I/O board is being tested.

14. The multiprocessing computer system as recited in claim 1 wherein the error cage is a part of a dynamic system domain hardware partition.

15. A method of testing an I/O board in a multiprocessing computer system, said method comprising:
   receiving an I/O board into one node of a plurality of processing nodes interconnected by a network;
   initiating a test process on a microprocessor board to test the I/O board; and
   selectively isolating communications from the I/O board directed to other nodes of said plurality of nodes;
   wherein selectively isolating communications further comprises providing a memory transaction cage configured to block out-of-range memory address communications generated by the I/O board as the I/O board is being tested.

16. A method of testing an I/O board in a multiprocessing computer system, said method comprising:
   receiving an I/O board into one node of a plurality of processing nodes interconnected by a network;
   initiating a test process on a microprocessor board to test the I/O board; and
   selectively isolating communications from the I/O board directed to other nodes of said plurality of nodes;
   wherein selectively isolating communications further comprises providing an interrupt transaction cage configured to block interrupts that are not to a selected destination.

17. A method of testing an I/O board in a multiprocessing computer system, said method comprising:
   receiving an I/O board into one node of a plurality of processing nodes interconnected by a network;
   initiating a test process on a microprocessor board to test the I/O board; and
   selectively isolating communications from the I/O board directed to other nodes of said plurality of nodes using an error cage;
   wherein the process to test the I/O board is performed by a microprocessor board in a different processing node than the I/O board.

18. The method of testing an I/O board as recited in claim 12, wherein the process to test the I/O board is carried out by a microprocessor and memory on the microprocessor board.

19. The method of testing an I/O board as recited in claim 12 wherein the microprocessor board includes a plurality of microprocessors connected by a bus and memory connected to the bus.

20. The method of testing an I/O board as recited in claim 12 wherein the processing node includes an expander board that receives the I/O board and the microprocessor board.

21. A method of testing an I/O board in a multiprocessing computer system, said method comprising:
   receiving an I/O board into one node of a plurality of processing nodes interconnected by a network;
   initiating a test process on a microprocessor board to test the I/O board; and
   selectively isolating communications from the I/O board directed to other nodes of said plurality of nodes using an error cage;
   wherein said plurality of processing nodes forms a distributed shared memory computer system.

22. A method of testing an I/O board in a multiprocessing computer system, said method comprising:
   receiving an I/O board into one node of a plurality of processing nodes interconnected by a network;
   initiating a test process on a microprocessor board to test the I/O board; and
   selectively isolating communications from the I/O board directed to other nodes of said plurality of nodes;
   wherein the selectively isolating communications step is carried out by an error cage that is a part of a dynamic system domain hardware partition.

23. A method of testing an I/O board in a multiprocessing computer system, said method comprising:
   receiving an I/O board into one node of a plurality of processing nodes interconnected by a network;
   initiating a test process on a microprocessor board to test the I/O board; and
   selectively isolating communications from the I/O board directed to other nodes of said plurality of nodes;
   wherein selectively isolating communications comprises providing a hardware failure cage configured to block parity errors, protocol errors and timeout errors generated by the I/O board as it is being tested.

* * * * *

UNITED STATES PATENT AND TRADEMARK OFFICE
CERTIFICATE OF CORRECTION

PATENT NO. : 6,571,360 B1
DATED : May 27, 2003
INVENTOR(S) : Drogichen et al.

It is certified that error appears in the above-identified patent and that said Letters Patent is hereby corrected as shown below:

<u>Column 14,</u>
Lines 5, 9 and 13, please change "12" to -- 17 --.

Signed and Sealed this

Thirtieth Day of September, 2003

JAMES E. ROGAN
*Director of the United States Patent and Trademark Office*